US010202247B2

(12) United States Patent
Graber et al.

(10) Patent No.: US 10,202,247 B2
(45) Date of Patent: Feb. 12, 2019

(54) SEPARATOR FOR BOOK BLOCKS

(71) Applicant: HUNKELER AG, Wikon (CH)

(72) Inventors: Kurt Graber, Brittnau (CH); Lukas Wullschleger, Brittnau (CH); Daniel Häfliger, Langnau (CH)

(73) Assignee: HUNKELER AG, Wikon (CH)

( * ) Notice: Subject to any disclaimer, the term of this patent is extended or adjusted under 35 U.S.C. 154(b) by 0 days.

(21) Appl. No.: 15/393,841

(22) Filed: Dec. 29, 2016

(65) Prior Publication Data

US 2017/0197797 A1 Jul. 13, 2017

(30) Foreign Application Priority Data

Jan. 11, 2016 (EP) .................................. 16150729

(51) Int. Cl.
| | |
|---|---|
| *B65H 3/12* | (2006.01) |
| *B65G 59/06* | (2006.01) |
| *B65G 15/00* | (2006.01) |
| *B65G 15/58* | (2006.01) |
| *B65H 5/22* | (2006.01) |

(52) U.S. Cl.
CPC ........... *B65G 59/068* (2013.01); *B65G 15/00* (2013.01); *B65G 15/58* (2013.01); *B65H 3/126* (2013.01); *B65H 5/224* (2013.01); *B65H 3/122* (2013.01); *B65H 3/124* (2013.01); *B65H 2404/623* (2013.01); *B65H 2405/1122* (2013.01); *B65H 2406/122* (2013.01); *B65H 2701/1932* (2013.01); *B65H 2801/48* (2013.01)

(58) Field of Classification Search
CPC ........ B65H 3/126; B65H 3/122; B65H 3/124; B65H 11/005; B65H 11/007; B65H 2301/42322; B65H 2301/44336; B65H 2301/42264
See application file for complete search history.

(56) References Cited

U.S. PATENT DOCUMENTS 4,181,298 A * 1/1980 Capdeboscq .......... B65H 3/042
271/106
5,836,582 A 11/1998 Ogawa et al.
6,022,014 A 2/2000 Rathert et al.
(Continued)

FOREIGN PATENT DOCUMENTS

| EP | 1829805 A2 | 9/2007 |
|---|---|---|
| EP | 2336059 A1 | 6/2011 |

OTHER PUBLICATIONS

Jul. 19, 2016 Search Report issued in European Patent Application No. 16150729.8.

*Primary Examiner* — Howard J Sanders
(74) *Attorney, Agent, or Firm* — Oliff PLC (57) ABSTRACT

A device for separating printed products out of a stack, the device including a feed device which defines a substantially horizontal plane, a first stop element which is arranged on a mounting support as well as a transfer device which defines a substantially horizontal plane, wherein the feed device moves the stack against the first stop element, wherein the transfer device accepts and transfers the bottommost printed product out of the stack from the feed device, wherein the feed device includes a vacuum conveyor, by means of which the bottom surface of the bottommost printed product is sucked up at least in portions, as well as to a corresponding method.

18 Claims, 3 Drawing Sheets

(56) References Cited

U.S. PATENT DOCUMENTS

| | | | | |
|---|---|---|---|---|
| 6,145,829 A | * | 11/2000 | Furmanski | B65H 3/122 |
| | | | | 271/100 |
| 9,102,487 B2 | * | 8/2015 | Tojima | B65H 1/06 |
| 2009/0189334 A1 | * | 7/2009 | Wallace | B65H 1/06 |
| | | | | 271/12 |

* cited by examiner

SEPARATOR FOR BOOK BLOCKS

The invention relates to a device and to a method for separating printed products out of a stack, a stack produced from individual printed products (i.e. in particular from adhesively bound printed products such as, for example, book blocks) being moved against a stop by means of a feed device such that the respectively bottommost printed product is able to pass the stop and be accepted and transferred by a transfer device.

EP 2 336 059 A1 discloses a device for separating printed products out of a stack, having a sliding device, which separates the printed products, and a removal device, which is connected downstream and conveys the separated printed products away, where the sliding device and the removal device both comprise rotary drives which are independent from one another. The sliding device and the removal device are driven in a rotary manner independently of one another and the printed products are accelerated in the sliding device to a first speed and in the removal device to a second speed which is faster in comparison with the first speed. A problem with the solution using sliders, however, is that the printed product is likely to experience something being abraded from the bottom surface of the bottommost printed product. In addition, in the case of said solution, difficulties can arise in particular when printed products that are of varying thicknesses and varying formats are to be processed.

It is consequently the object of the present invention to provide for a separation of printed products out of stack, said separation being managed without a mechanical slider or lateral stops and supports and, at the same time, ensuring the printed products or the stack are conveyed in a particularly effective and careful manner (in particular in a friction-free manner).

Said object is achieved according to the invention by a device for separating printed products out of a stack, said device comprising a feed device which defines a substantially horizontal plane E, a first stop element which is arranged on a mounting support, as well as a transfer device which defines a substantially horizontal plane E', wherein the feed device moves the stack against the first stop element, wherein the transfer device accepts and transfers the bottommost printed product out of the stack from the feed device, wherein the feed device includes a vacuum conveyor, by means of which the bottom surface of the bottommost printed product is sucked up, at least in portions, and the object is also achieved by a method for separating printed products out a stack, said method including the following steps: (a) sucking up, at least in portions, the bottom surface of the bottommost printed product out of the stack by means of a vacuum that is generated in a feed device; (b) moving the stack by means of the feed device against a first stop element, such that (c) the bottommost printed product out of the stack passes the first stop element and (d) is accepted and transferred by a transfer device.

In a preferred embodiment of the present invention, the vacuum conveyor is developed as a perforated conveyor with a vacuum applied thereto in order to prevent the stack from slipping. In this connection, as is known per se, the stack is sucked up or fixed on the conveyor at a defined negative pressure in each case over the length of the conveying section. To this end, a vacuum, which is directed for instance into a vacuum channel, is generated by means of a vacuum pump. The vacuum is uniformly distributed by means of the vacuum channel and is run to the required places. The conveyor belt, in this case, is preferably perforated corresponding to the vacuum channel and transmits the negative pressure to the stack to be conveyed. The respective vacuum intensity can be adjusted over the width of the vacuum conveyor or perforated conveyor and, sometimes, also over the hole pattern in the conveyor belt. Where applicable, several vacuum pumps or vacuum channels which are independent of one another can also be used.

In a preferred embodiment, apart from this, a series of smaller (series-connected) conveyor segments for transporting the stack or the printed products is provided in place of one single vacuum conveyor. As a result, it is possible to react, where required, in a more flexible manner to changing requirements. In this connection, it should be pointed out that, in particular in the case of relatively long printed products, the problem can occur where a rear conveyor segment is still sucking-up a printed product which is being pulled by a front conveyor segment. This problem can be countered as a result of the individual conveyor segments being controlled individually, such that, where applicable, the rearmost conveyor segment can be switched off when there is still pulling at the front.

In a further preferred embodiment of the present invention, the vacuum conveyor or the perforated conveyor of the feed device comprises a width $B_1$ which is smaller than the width $B_2$ of the stack, wherein the ratio of the width B2 to the width B1 is preferably at least 2:1, further preferably at least 3:1 and even further preferably at least 4:1. The stack is arranged, apart from this, in a regularly central manner on the vacuum conveyor or perforated conveyor.

In a further preferred embodiment of the present invention, the feed device comprises valve devices which are arranged on both sides of the vacuum conveyor or perforated conveyor for generating an air cushion. In this case, for supporting clean, i.e. in particular friction-free, discharging of also large-format stacks, ball valves are arranged in the plane E or on a supporting table next to the vacuum conveyor or perforated conveyor, by means of each of which ball valves an air cushion is able to be generated, on which the corresponding side regions of the stack are able to rest for the purposes of frictionless transport. In particular, in the case of large format stacks, this also ensures that the stack rests cleanly in a centered manner on the vacuum conveyor or perforated conveyor. The ball valves include, as a rule, spring-preloaded balls which, in the non-loaded state, close an air nozzle or an air outlet opening and which, under load, are depressed and thus release the air nozzle or the air outlet opening.

In a further preferred embodiment of the present invention, the first stop element is arranged so as to be height-adjustable on the mounting support. The mounting support, in this case, is arranged correspondingly in the transition region between the planes E or E' of the feed device or transfer device. The first stop element is arranged correspondingly above the planes E or E' so as to be height adjustable such that the bottommost printed product to be respectively separated is able to guide through below the first stop element. The height adjustment, in this case, can be effected manually or automatically (more details in this connection further below). In other words, the gap S, which is between the first stop element and the conveying plane E or E', is adapted to the thickness of the respective printed product by means of the height-adjustable first stop element. Typically, in this case, the gap S is only slightly thicker than the respective printed product (where applicable, with the exception of the last element in the stack). The gap S, in this case, preferably corresponds to the thickness of the respectively bottommost printed product or of the printed product to be separated plus approximately 3 to 5 mm, in a particularly preferred manner plus approximately 4 mm.

In a preferred manner, the height adjustment of the first stop element (as well as, where applicable, also the stop element itself) is arranged in a perpendicular manner. It has been shown that in this way the feed operation can basically be effected with better quality than if the stop element were to be at an angle. When the stack knocks against the first perpendicular stop element, the residual stack is slightly deformed by the (resilient) impact. As a result, a kind of staircase effect is created where the stack is inclined slightly rearwardly. The advantage of this is that a good point of attack for an air nozzle is created, which air nozzle creates an air pocket between the printed product to be separated and the residual stack. Said deformation, however, makes it necessary, as a rule, for the stack to move back to a second (rear) stop element in order to compensate for the displacements inside the stack (more details in this connection further below).

In a further preferred embodiment of the present invention, the transfer device also includes a vacuum conveyor. Other conveying devices, such as for instance a roller conveyor or a normal belt conveyor, are certainly also conceivable here. The feed device and the transfer device are preferably spaced somewhat apart from one another in order to ensure the separating of the respectively bottommost printed product in conjunction with the first stop element as well as the acceptance of the separated printed product by the transfer device. In particular, the two vacuum conveyors should naturally not come into contact with one another. Apart from this, the (second) vacuum conveyor of the transfer device is regularly wider than that of the feed device, by the factor of between 1.5 and 2.5, preferably for instance by the factor 2.

In a preferred embodiment of the present invention, an air nozzle device, which, after the impact of the stack against the first stop element, generates an air cushion between the top surface of the printed product, which is conveyed through preferably below the first stop element, and the residual stack, is arranged on the first stop element. To this end, the air nozzle device is provided in a preferred manner on the bottom surface of the height-adjustable first stop element, against which the stack to be displaced is moved. The air nozzle device preferably includes several small air outlets or air outlet openings which are distributed over the entire length of the stop. However, one single (continuous) nozzle or opening is basically also conceivable.

According to a particularly preferred embodiment, the air nozzle device comprises a crenellated structure. The air outlet openings, in this case are preferably provided in the indentations between the individual crenellations.

Further preferably, (in the case of both aforenamed embodiments), the air nozzle device is arranged on the first stop element so as to be angularly adjustable. The preferred angle at which the air is blown out is usually between 5° and 50° (in relation to the perpendicular), in an even more preferred manner between 15° and 40°.

In a further preferred embodiment of the present invention, the air nozzle device or the first stop element includes a first detection device which serves for detecting the front edge of the bottommost printed product directly after the impact of the stack against the first stop element. Said first detection device is arranged in an expedient manner laterally on the first stop element so as to be adjustable. By means of the first detection device, the air nozzle device can be activated by means of a suitable control unit for generating the aforementioned air cushion. As soon as the bottommost printed product moves out, air is blown between it and the residual stack.

In a further preferred embodiment of the present invention, the transfer device comprises a pressing element for the respectively separated (and to be transferred) printed product. The pressing element is preferably realized in the form of a rotatably mounted brush which is driven in rotation preferably (but not necessarily) by means of a motor. It is also possible for the brush to be entrained with the printed product to be displaced without a driving means.

The brush rotates in each case in the opposite direction to the conveyor of the transfer device. In addition, the brush, as a rule, is mounted on the mounting support—when viewed in the direction of transport—on the rear surface of the first stop element (i.e. above the starting area of the conveyor of the transfer device) and further preferably is pretensioned downward, i.e. in the direction of the printed product to be transferred, by means of a spring mechanism. However, it would also be possible to provide a pressing roller or a pressing frame, for example, as a pressing element in place of a brush.

The pressing element or the brush is distinctly important for ensuring fault-free separation. In said context, it must be noted that the return transport of the remaining stack is already active before the bottommost book block has been completely displaced. In other words, the (narrower) vacuum conveyor of the feed device has therefore already been moved rearward in each case (i.e. in order to move the remaining stack against the rear stop) before the bottommost printed product has been displaced. So that the bottommost product (or the bottommost book block) nevertheless moves out completely, it is then, however, pulled by the second vacuum conveyor (i.e. of the transfer device).

The pressing element or the brush ensures, in this case, that the printed product is pressed onto the conveyor of the transfer device. This ensures that the adhesion to the displacing conveyor belt is greater than that to the narrower belt of the feed device, which is already moving back again in order to ensure a clean transition. In this way, in particular creasing or flipping of the bottommost sheet of the newly bottommost printed product in the residual stack (i.e. the printed product which, after transferring the bottommost printed product to the transfer device, comes to be the bottommost product during the return transport of the residual stack) can be prevented in this way, as well as displacement of sheets in the printed product or in the stack in general.

In a preferred manner, the circumferential speed of the brush is the same or somewhat faster than the speed of the transporting belt or conveyor belt of the transfer device. This prevents the topmost sheets of the printed product to be transferred becoming creased.

During the short period when the bottommost book block is accepted by the (wider) conveyor of the transverse device, both conveyors preferably run in a synchronous manner at the same speed in order to be able to ensure a fault-free transfer. Before this or after it, the speeds of the two belts can, however, be totally different. As described above, the two conveyors are at times even moved in opposite directions.

In a further preferred embodiment of the present invention, a second detection device, which recognizes when the front edge of the separated printed products or of the printed products to be transferred has been detected by the transfer device, is arranged on the mounting support. The second detection device, in this case, is mounted on the rear surface of the mounting support—when viewed in the direction of transport—as a rule above (and where applicable somewhat downstream) of the brush or of the pressing element. As soon as the leading edge of the book block has passed said sensor and has been operatively detected, the (narrower) vacuum conveyor of the feed device starts the return transport of the residual stack.

In a further preferred embodiment of the present invention, the feed device includes a second rear stop element. Said rear stop element serves for aligning the residual stack. As a rule, it is developed so as to be lowerable such that it can be used on a transport line without causing a disturbance when a new stack is delivered, i.e. when the preceding stack has been completely separated. Other suitable adjusting mechanisms are also conceivable (e.g. moving laterally moving upward or pivoting etc.).

The return travel of the remaining stack, however, does not just serve for the alignment—and consequently for the stabilization—of the remaining stack, but preferably also for reading out information which is provided, for instance, on the bottom surface of the (new) bottommost printed product; the same also applies, in particular, when the still complete stack is moved into the feed device.

This preferably occurs by means of a third detection device, for instance a scanner or a camera, for reading corresponding codes (e.g. barcodes or bar codes). This comes into effect in particular when printed products of different formats are stacked. In this respect, the code can include information referring to the thickness, the length and, where applicable, also the width of the individual printed products such that the corresponding settings can automatically be undertaken (i.e. for example, the height of the first stop element, the speed of the two vacuum conveyors and of the pressing brush, the actuation of the lateral ball valves or, however, the movement of the rear stop). The corresponding information certainly does not necessarily have to be included in the code (itself); rather, the code can also form, for example, a reference to an electronic data storage unit (for instance a data bank), which, in turn, holds the necessary data.

In a preferred embodiment of the method according to the invention, the feed device and the transfer device include vacuum conveyors, wherein the vacuum conveyor of the transfer device preferably comprises a width $B_3$ which is greater than the width $B_1$ of the vacuum conveyor of the feed device. Reliable acceptance of the respective printed product by the transfer device or the vacuum conveyor thereof is ensured in this way.

In a further preferred embodiment of the method according to the invention, as already mentioned above, the vacuum conveyors of the feed device and of the transfer device are operated in a synchronous manner at the same speed, at least at the start of the acceptance of the bottommost printed product by the transfer device.

In a further preferred embodiment of the method according to the invention, the feed device is moved with the residual stack in a rearward direction even before the acceptance of the bottommost printed product by the transfer device has been concluded (e.g. when the front edge of the respective printed product is recognized by the second detection device). The printed product to be separated and the residual stack can be pulled apart cleanly in this way. Subsequently, the residual stack is aligned at the rear stop element.

In a further preferred embodiment of the method according to the invention, as described beforehand, information on the bottom surface of the now bottommost printed product is read out during the return transport of the residual stack. This occurs by means of a corresponding third detection device.

In an even further preferred embodiment of the method according to the invention, the first stop element is height adjustable in relation to a mounting support in order to adapt the conveying gap (gap S) in this way to the thickness of the respective printed products (i.e. for instance by means of coded information). Apart from this, dynamic adaption can also be performed according to the invention with regard to further method parameters, namely for instance, the control of the suction vacuum of the conveyors and the control of the conveying speeds.

The accompanying drawings serve for the purposes of illustration and in this respect just provide preferred embodiments of the present invention as examples. Said drawings are as follows.

Figure 1:
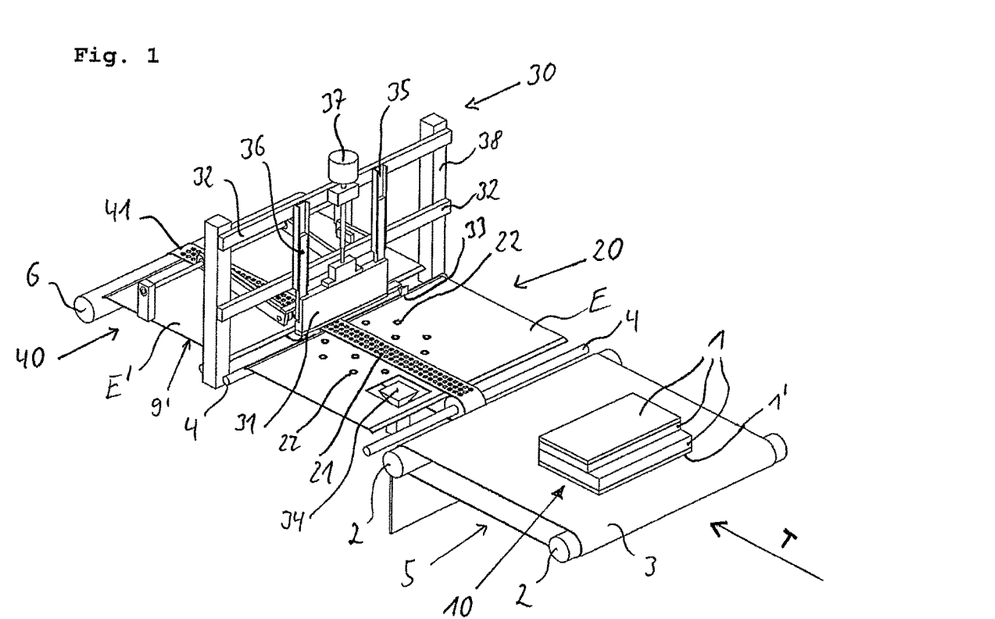
FIG. 1 shows a perspective view of a device according to the invention, with a stack of printed products being delivered.

FIG. 1 shows a perspective view of a device according to the invention, with a stack 10, which in the present case (as an example) consists of four printed products 1 or 1', being delivered, the printed product 1' being the bottommost printed product in the stack 10. The delivery conveyor 5 includes at least two rollers 2 around which the delivery belt 3 runs. The coded information on the bottom surface of the bottommost printed product 1' is preferably read out in the feed device 20 by means of the (third) detection device 34 and is converted correspondingly by means of a suitable control unit (not shown).

The delivery belt 3 is usually realized from plastics material, or from rubberized plastic material, in order to prevent the stack 10 or the individual printed products 1 or 1' from slipping during the delivery. The conveying direction is specified by way of the arrow T. The delivery conveyor 5 is motor-driven as a rule, it being possible for one of the two rollers 2 to serve also as a drive roller. From the delivery conveyor 5, the stack 10 is then transferred to the feed device 20.

The feed device 20 generally defines a plane E, usually in the form of a supporting table 9 (cf. FIG. 2) and is provided over and above this with a vacuum conveyor 21. The vacuum conveyor 21 is developed in said embodiment, as can be seen, as a perforated conveyor. A vacuum is applied to said perforated conveyor in order to suck up the bottom surface of the bottommost printed product 1' of the stack 10.

The stack 10 is able to be further conveyed reliably in this way, i.e. in particular without the individual printed products 1 or 1' slipping inside the stack 10. The sucking up or fixing of the stack 10 is effected in this case on the conveyor 21 at a defined negative pressure, in each case preferably over the length of the conveying section.

A vacuum, which is run for instance into a vacuum channel, is generated in the usual manner by means of a vacuum pump (not shown). The vacuum is uniformly distributed by means of the vacuum channel and is directed to the required places. The negative pressure is finally transmitted to the stack 10 to be conveyed as a result of the perforated vacuum conveyor 21.

Figure 2:
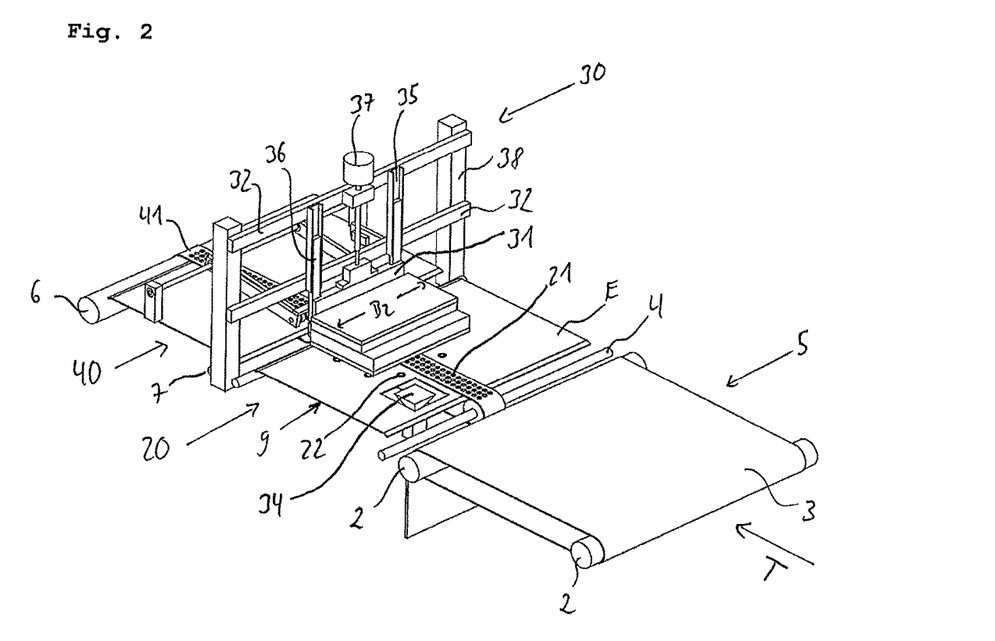
FIG. 2 shows a perspective view of a device according to the invention, with the stack knocking against the first stop element.

As can also be seen in conjunction with FIG. 2, the feed device 20 serves for conveying the stack 10 against a first stop element 31, which is arranged on a mounting support 30. The stack 10, in turn, consists of the four printed products 1, 1', the bottommost printed product being designated by way of the reference symbol 1'.

In the present case, the printed products all comprise a width $B_2$, they are, however, developed differently with regard to their length (i.e. their dimension in the direction of transport T). However, it is also conceivable, in principle, for the printed products 1 or 1' to comprise different widths. In particular, however, the individual printed products 1 or 1' differ as regards their thickness. The vacuum conveyor 21 runs around the supporting table 9 which defines the plane E, about the rollers 4 which, in the present embodiment, comprise a thickening in their center. The thickening corresponds to the width $B_1$ (cf. FIG. 3) of the belt of the vacuum conveyor 21.

The stack 10 preferably rests centrally on the considerably narrower vacuum conveyor 21 such that it also comes to rest on both sides on the supporting table 9. So that there is not any friction on or abrading of the printed product, valve devices 22, which are regularly realized in the form of ball valves, are incorporated in the supporting table 9. As a result of the pressure force, which the side regions of the stack 10, which overlap the vacuum conveyor 21, exert on the ball valves 22, said ball valves are activated (i.e. as a rule a ball is pressed down in opposition to a spring force such that air is able to emerge out of the corresponding outlet opening or nozzle). An air cushion, on which the stack is easily able to slide when being conveyed by the vacuum conveyor 21, i.e. until it reaches the first stop element 31, is generated in this manner.

The first stop element 31 is adjustable in height or is guided on a mounting support 30 so as to be height-adjustable. The mounting support 30 comprises first of all two longitudinal beams 38 which are connected by means of two cross beams 32. Two guide rails 35, in which corresponding guide rods 36 of the first stop element 31 are slidingly guided, are arranged, in turn, in the vertical direction on the cross beams 32. The guide rods 36 are regularly fastened to the first stop element 31 in a releasable manner.

An electric motor 37 is arranged between the two guide rails 35 on the upper of the two cross beams 32, which electric motor drives a threaded rod, by means of which the first stop element 31 can be moved up and down in order, in this way, to be able to adjust the gap S between the bottom surface of the first stop element 31 and the plane E or the supporting table 9 to the corresponding thickness of the respectively bottommost printed product 1'. A first detection device 22 is also arranged, as a rule, on the first stop element 31, said first detection device serving for the purpose, directly after the impact of the stack 10, of detecting when the front edge 1a' of the bottommost printed product 1' to be separated is advanced out of the stack 10 or passes under the first stop element 31.

At said moment, by means of a control unit which is known per se and not shown here, an air nozzle device 39 (cf. FIG. 5) on the bottom surface of the first stop element 31 is activated. In this way, an air cushion is provided between the top surface of the printed product 1' to be separated and the residual stack 10', which air cushion serves for separating the printed product 1' in a low-friction manner and transferring it in a reliable manner to the transfer device 40.

In this connection it should be pointed out that even before the bottommost printed product 1' to be separated rests completely on the conveyor 41 of the transfer device 40, the vacuum conveyor 21 of the feed device has already been operated rearward (i.e. in the direction of the arrow R). This once again contributes to the fact that the separation runs in a frictionless manner and in particular the bottommost surface of the residual stack 10' is not creased or flipped.

Figure 3:
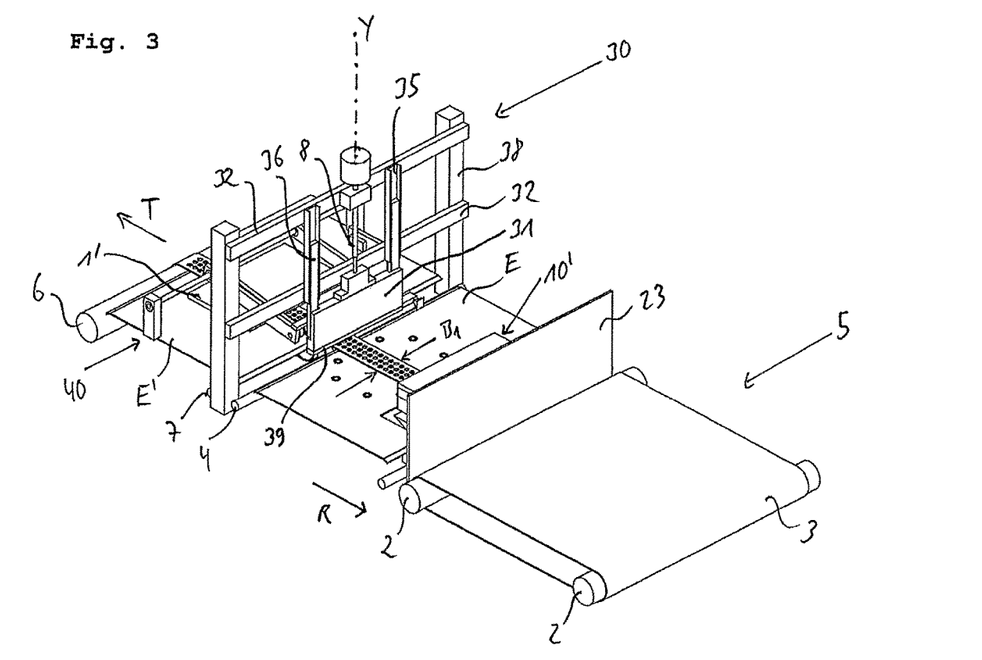
FIG. 3 shows a perspective view of a device according to the invention, with the separated printed product being transferred in the direction of transport as well as with the residual stack being (simultaneously) transported in the rearward direction.
Figure 4:
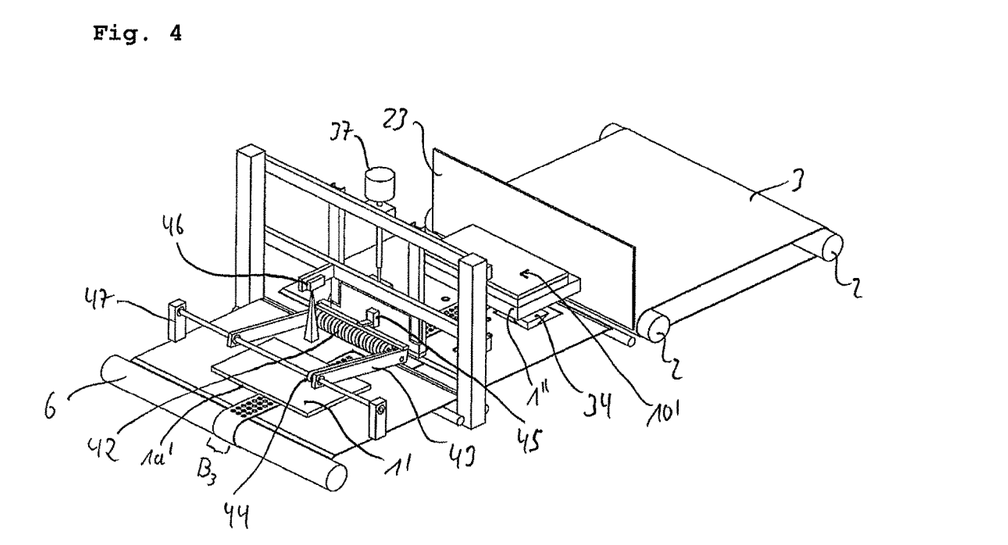
FIG. 4 shows a perspective view of a device according to the invention in the same position as in FIG. 3, when viewed from the transfer conveyor end.

FIG. 3 shows the printed product 1', which has been accepted by the transfer device 40 or the vacuum conveyor 41 thereof and is, in turn, with its width $B_3$, wider than the conveyor belt of the vacuum conveyor 41 (cf. FIG. 4). In the embodiment shown, the supporting table 9' of the transfer device 40 does not comprise a valve device 22 (or ball valves) as the entire weight of the residual stack 10' is no longer weighing down the separated printed product 1' here.

It is certainly naturally imaginable for the supporting table 9' of the transfer device 40 also to have corresponding ball valves 22, depending on the desired width of the printed product to be separated. The vacuum conveyor 41 of the transfer device 40 is driven by means of the rollers 6 and 7, at least the roller 7 corresponding in its design to the rollers 4 of the feed device 20. As a result of the rollers 4 and 7 not having the full diameter over their entire length, space is able to be saved, which is advantageous to the fault-free operation of the device.

As can be seen the best in FIG. 4, a second detection device 46 is provided on the—viewed in the direction of transport T—rear side of the mounted support 30. Said second detection device is preferably arranged such that it detects when the printed product 1' moves into operative engagement with the vacuum conveyor 41 of the transfer device. This triggers the return transport of the residual stack 10' on the vacuum conveyor 21 of the feed device 20 by means of the aforementioned control unit and prevents creasing or flipping of, in particular, the bottommost side of the bottommost printed product 1" of the residual stack 10'.

In order to be able to ensure that the separated printed product 1' is accepted by the transfer device 40 in a fault-free manner, another pressing element 42 is, as a rule, provided (regularly in the form of a brush), by means of which the printed product 1' is pressed onto the vacuum conveyor 41 of the transfer device 40. The pressing element, in this case, is pivotably mounted on a holding device 47 by means of holding rods 43 and is pressed downward onto the printed product 1' by means of a spring element 45, which is mounted, for instance, on the rear side of the first stop element 31. The residual stack 10', which is now traveling backward, is moved against a second, rear, stop element 23 in order to re-align said stack. This is necessary sometimes as when the stack 10 is knocked against the first stop element 31, displacements inside the stack or the residual stack 10' can occur.

The rear stop element 23 is, as a rule, arranged so as to be lowerable between the delivery belt 5 and the feed device 20 in order not to obstruct the delivery of new stacks 10. The raising of the second stop or rear stop element 23 is triggered, as a rule, by the second detection device 46. On the return transport path along the arrow R (cf. FIG. 3), the residual stack 10' with its newly bottommost printed product 1" passes another third detection device 34, which can read out information on the bottom surface of the newly bottommost printed product 1".

The third detection device 34 is developed, for example, in the form of a scanner or a camera which detects a bar code or barcode on the bottom surface of the respectively bottommost printed product. In this case, this can be a normal bar code or barcode or also a matrix barcode. The codes include, in each case, information with regard to the thickness or also to the length and width of the bottommost printed product 1" that is to be newly separated. The corresponding information does not necessarily have to be included in the code (itself); but rather, the code can also form, for example, a reference to the electronic data storage (for instance to a data bank) which, in turn, holds the necessary data. In other words, the first stop element 31 can be automatically adjusted to the printed product 1" to be newly separated in this manner (i.e. adapting the gap S). The gap S preferably corresponds to the thickness of the respectively bottommost printed product or to the printed product to be separated plus approximately between 3 and 5 mm, in a particularly preferred manner plus approximately 4 mm.

The method sequence depicted above is repeated until the topmost printed product 1 of a stack 10 has also been separated and a new stack 10 is delivered by the delivery belt 5 into the feed device 20.

Figure 5:
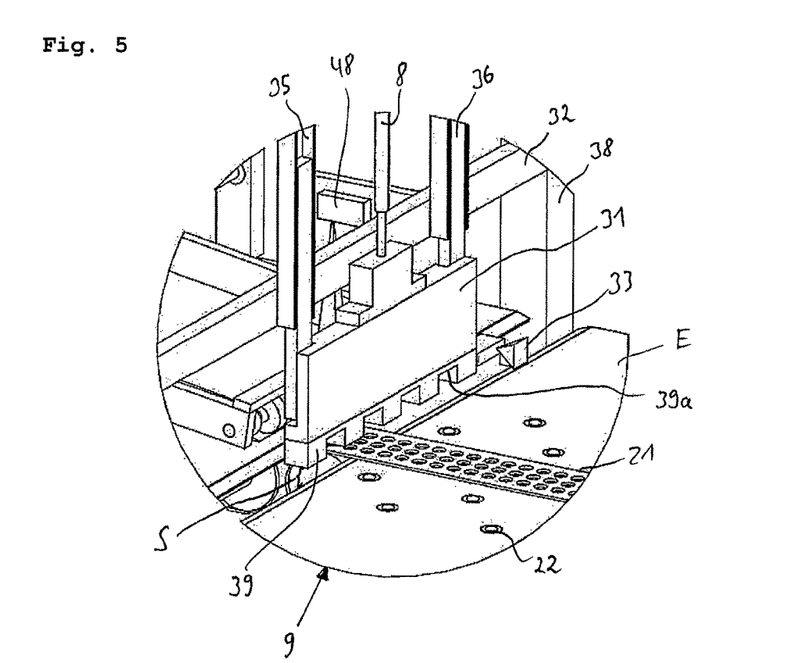
FIG. 5 shows a view of a detail of a preferred embodiment of an air nozzle device in accordance with the present invention.

FIG. 5 then shows a view of a detail of a preferred embodiment of an air nozzle device 39 which is arranged on the bottom surface of the first stop element 31. According to said preferred embodiment, the air nozzle device comprises a crenellated structure. The air outlet openings 39a are provided, in this case, in the indentations of the crenellations. The present representation of the crenellated structure serves for the purpose of better clarity and in this respect is not to be seen as true to scale.

As indicated in FIG. 3, the air nozzle device 39 can certainly also be provided in the form of a substantially flat strip, with corresponding air outlet openings therein.

Figure 6:
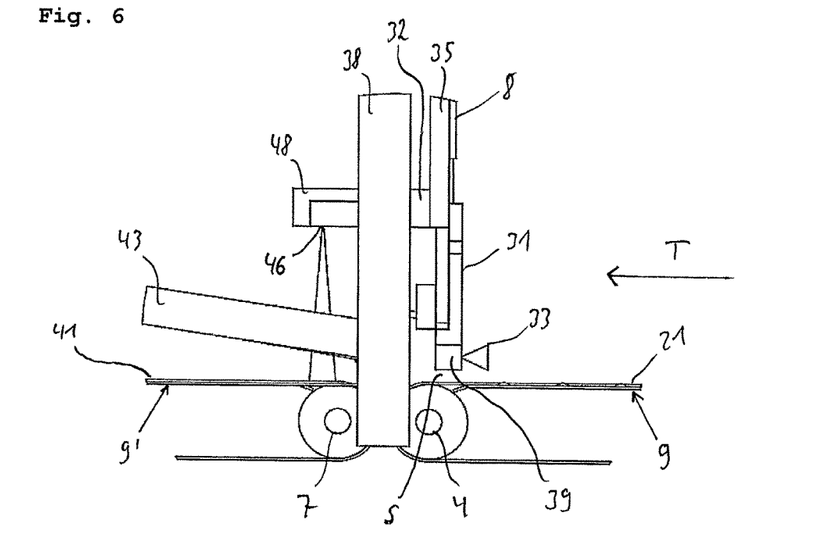
FIG. 6 shows a schematic partial side view of a device according to the invention.

The device according to the invention is shown once again schematically in a partial side view in FIG. 6. The longitudinal beam 38, in this case, separates the two supporting tables 9 and 9' with their vacuum conveyors 21 and 41. The vacuum conveyor 21 of the feed device 20, in this case, runs about the roller 4 and the vacuum conveyor 41 of the transfer device 40, in this case, runs about the roller 7.

The guide rail 35 for the guide rod 36 of the first stop element 31 is arranged to the right of the longitudinal beam 38, somewhat above the roller 4 on the (bottom) cross beam 32. The air nozzle device 39 is arranged on the bottom surface of the first stop element 31. The first detection device 33, which is mounted, for instance, on a lateral region or lateral continuation of the air nozzle device 39, is provided at the height of the front side of the first stop element 31, when viewed in the direction of transport T.

The first detection device 33 detects when—directly after the impact of the stack 10 against the first stop element 31—the front edge 1a' of the bottommost printed product 1' to be separated is pushed forward from the stack 10 or passes under the first stop element 31. The air nozzle device 39 is then activated in a corresponding manner. It must be noted in said context that the first detection device 33 does not regularly protrude in this respect beyond the front surface of the first stop element 31. The schematic representation according to FIG. 6 is to indicate that the detection is effected in the region of or on the front edge of the first stop element 31.

The second detection device 46, which is mounted on a fastening projection 48 which, in turn, projects from the (bottom) cross beam 32, can be recognized on the left-hand side of the longitudinal beam 38 when viewed in the direction of transport T.

The second detection device 46 projects above the supporting table 9' or the vacuum conveyor 41 to such an extent that it is able to detect when the printed product 1' has moved into operative engagement with the vacuum conveyor 41 of the transfer device (i.e. has come to rest to such an extent on the vacuum conveyor 41 that it is able to be transferred on its own by said vacuum conveyor, even if part of the printed product 1' still rests on the vacuum conveyor 21). At this moment, the return transport of the residual stack 10' on the vacuum conveyor 21 of the feed device 20 is triggered by means of a control unit that is known per se, as a result of which creasing or flipping of, in particular, the bottommost sheet of the bottommost printed product 1" of the residual stack 10' can be prevented in an effective manner. In other words, the printed product 1' to be separated and the residual stack 10' are pulled apart cleanly as a result of switching to operating in the opposite direction.

Finally, the holding rods for the pressing element 42, by way of which the printed product 1' is pressed onto the vacuum conveyor 41 of the transfer device 40, can be seen once again in FIG. 6.

LIST OF REFERENCES

1 Printed products
1' Bottommost printed product of the stack (for separation)
1a' Front edge of the printed product to be separated
1" Bottommost printed product of the residual stack
2 Rollers
3 Delivery belt
4 Rollers
5 Delivery conveyor
6 Rollers
7 Rollers
8 Threaded rod
9 Supporting table
9' Supporting table
10 Stack
10' Residual stack
20 Feed device
21 Vacuum conveyor
22 Valve device
23 Second (rear) stop element
30 Mounting support
31 First stop element
32 Cross beam
33 First detection device
34 Third detection device
35 Guide rails
36 Guide rods
37 Motor
38 Longitudinal beam
39 Air nozzle device
39a Air outlet openings
40 Transfer device
41 Vacuum conveyor
42 Pressing element (brush)
43 Holding rods
44 Drive belt
45 Spring element
46 Second detection device
47 Holding device 48 Fastening projection
B₁ Width of the vacuum conveyor (feed device)
B₂ Width of the stack
B₃ Width of the vacuum conveyor (transfer device)
E Plane of the feed device
E' Plane of the transfer device
R Direction of transport backwards
S Gap
T Direction of transport
Y Vertical axis

The invention claimed is:

1. A device for separating printed products out of a stack, said device comprising
a control unit,
a feed device which defines a substantially horizontal plane in the form of a supporting table,
a first stop element which is arranged on a mounting support, and
a transfer device which defines a substantially horizontal plane,
wherein the feed device moves the stack in a forward direction against the first stop element,
wherein the transfer device accepts and transfers the bottommost printed product out of the stack from the feed device,
wherein the feed device includes a vacuum conveyor, by means of which the bottom surface of the bottommost printed product is sucked up at least in portions leaving a residual stack,
wherein the vacuum conveyor comprises a width which is smaller than the width of the stack, and
wherein the feed device comprises valve devices which are integrated in the supporting table on both sides of the vacuum conveyor for generating an air cushion,
wherein the control unit is configured to trigger a return transport of the residual stack on the vacuum conveyor of the feed device in a rearward direction opposite of the forward direction, and
wherein the feed device is moved with the residual stack in the rearward direction before the acceptance of the bottommost printed product by the transfer device has been concluded wherein the bottommost printed product and the residual stack are pulled apart.

2. The device as claimed in claim 1, wherein the vacuum conveyor is developed as a perforated conveyor with a vacuum applied thereto.

3. The device as claimed in claim 1, wherein a ratio of the width of the stack to the width of the vacuum conveyor is at least 2:1.

4. The device as claimed in claim 1, wherein the first stop element is arranged so as to be height-adjustable on the mounting support.

5. The device as claimed in claim 1, wherein the transfer device also includes a vacuum conveyor.

6. The device as claimed in claim 1, wherein an air nozzle device, which, after the stack has impacted against the first stop element, generates an air cushion between the top surface of the printed product, which is conveyed through preferably under the first stop element, and the residual stack, is arranged on the first stop element.

7. The device as claimed in claim 6, wherein the air nozzle device includes a first detection device which serves for detecting the front edge of the bottommost printed product directly after the impact of the stack against the first stop element.

8. The device as claimed in claim 1, wherein the transfer device comprises a pressing element for the separated printed product.

9. The device as claimed in claim 1, wherein a second detection device, which recognizes when the front edge of the separated printed product has been detected by the transfer device, is arranged on the mounting support.

10. The device as claimed in claim 1, wherein the feed device includes a second, rear, stop element.

11. The device as claimed in claim 1, wherein the vacuum conveyor comprises a width which is smaller than the width of the stack, wherein the ratio of the width of the stack to the width of the vacuum conveyor is at least 3:1.

12. The device as claimed in claim 1, wherein the vacuum conveyor comprises a width which is smaller than the width of the stack, wherein the ratio of the width of the stack to the width of the vacuum conveyor is at least 4:1.

13. A method for separating printed products out of a stack, said method including the following steps:
(a) sucking, at least in portions, the bottom surface of the bottommost printed product out of the stack by means of a vacuum that is generated in a feed device thereby leaving a residual stack, wherein the feed device comprises a supporting table and a vacuum conveyor, wherein the width of the vacuum conveyor is smaller than the width of the stack;
(b) moving the stack in a forward direction by means of the vacuum conveyor against a first stop element, such that
(c) the bottommost printed product out of the stack passes the first stop element and
(d) is accepted and transferred by a transfer device,
wherein during movement of the stack according to step (b), an air cushion is generated by means of valve devices which are integrated in the supporting table on both sides of the vacuum conveyor, and
(e) moving the feed device with the residual stack in a rearward direction opposite of the forward direction before the acceptance of the bottommost printed product by the transfer device according to step (d) has been concluded such that the bottommost printed product and the residual stack are pulled apart,
wherein movement of the residual stack on the vacuum conveyor of the feed device in the rearward direction is triggered by means of a control unit.

14. The method as claimed in claim 13, wherein the feed device and the transfer device includes vacuum conveyors, wherein the vacuum conveyor of the transfer device preferably comprises a width which is greater than the width of the vacuum conveyor of the feed device.

15. The method as claimed in claim 13, wherein the vacuum conveyor of the feed device and a vacuum conveyor of the transfer device are operated in a synchronous manner at the same speed, at least at the start of the acceptance of the bottommost printed product by the transfer device.

16. The method as claimed in claim 13, wherein in a further step (f) the residual stack is aligned at a second, rear, stop element.

17. The method as claimed in claim 16, wherein information on the bottom surface of the now bottommost printed product of the residual stack is read out during the return transport of the residual stack.

18. The method as claimed in claim 13, wherein the first stop element is height adjustable in relation to a mounting support.

* * * * *